US006867836B2

(12) United States Patent
Stalder et al.

(10) Patent No.: US 6,867,836 B2
(45) Date of Patent: Mar. 15, 2005

(54) NEMATIC LIQUID CRYSTAL ELECTROOPTICAL ELEMENT AND DEVICE

(75) Inventors: Martin Stalder, Oberwil (CH); Martin Schadt, Seltisberg (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 10/332,010

(22) PCT Filed: Jul. 3, 2001

(86) PCT No.: PCT/CH01/00412

§ 371 (c)(1),
(2), (4) Date: Jan. 3, 2003

(87) PCT Pub. No.: WO02/03128

PCT Pub. Date: Jan. 10, 2002

(65) Prior Publication Data

US 2003/0147033 A1 Aug. 7, 2003

(30) Foreign Application Priority Data

Jul. 5, 2000 (EP) .......................................... 00810592
Apr. 24, 2001 (EP) .......................................... 01810400

(51) Int. Cl.[7] ................................................ G02F 1/13
(52) U.S. Cl. ...................................... 349/129; 349/177
(58) Field of Search ................................. 349/129, 177

(56) References Cited

U.S. PATENT DOCUMENTS

| 4,333,708 | A | * | 6/1982 | Boyd et al. ................. 349/129 |
| 4,400,060 | A | * | 8/1983 | Cheng ........................ 349/129 |
| 4,601,543 | A | * | 7/1986 | Boyd et al. ................... 349/23 |
| 5,831,700 | A | | 11/1998 | Li et al. |
| 5,838,407 | A | | 11/1998 | Chigrinov et al. |
| 5,889,566 | A | | 3/1999 | Wu et al. |
| 6,072,558 | A | * | 6/2000 | Tanaka et al. .............. 349/179 |
| 6,081,314 | A | | 6/2000 | Suzuki et al. |
| 6,512,569 | B1 | * | 1/2003 | Acosta et al. ............... 349/181 |
| 6,542,211 | B1 | * | 4/2003 | Okada et al. ............... 349/130 |
| 6,798,481 | B2 | * | 9/2004 | Kitson et al. ............... 349/129 |

FOREIGN PATENT DOCUMENTS

| EP | 0 579 247 | 1/1994 |
| EP | 0 763 552 | 3/1997 |
| WO | WO 97/17632 | 5/1997 |

OTHER PUBLICATIONS

Japan '94, pp. 68 to 79.
Y. Koike et al, 41.5: Late–News Paper: A Full–Color TFT–LCD with a Domain–Divided Twisted–Nematic Structure, SID 92 Digest, pp. 798–801.

* cited by examiner

*Primary Examiner*—Kenneth Parker
(74) *Attorney, Agent, or Firm*—Sughrue Mion, PLLC

(57) ABSTRACT

A liquid crystal electrooptical element is disclosed that comprises a pair of substrates positioned between a pair of polarising plates, electrodes defining pixel areas and alignment layers disposed on the respective opposing inside surfaces of the substrates, and a chiral nematic liquid crystal sandwiched between the pair of surfaces. At least one of the alignment layers may be patterned in such a way that the azimuth or pretilt or both alignment directions are different at the substrate interfaces suppressing the growth of the ground state of the liquid crystal. When an initial electrical pulse is applied, one of the at least two bistable states can be reached, wherein the contrast ratio between the bistable states is two or greater. A device with such features is long-term bistable and does not require electronic refreshing as long as the displayed information is not changed. Therefore, the power consumption of this bistable device is minimal.

27 Claims, 14 Drawing Sheets

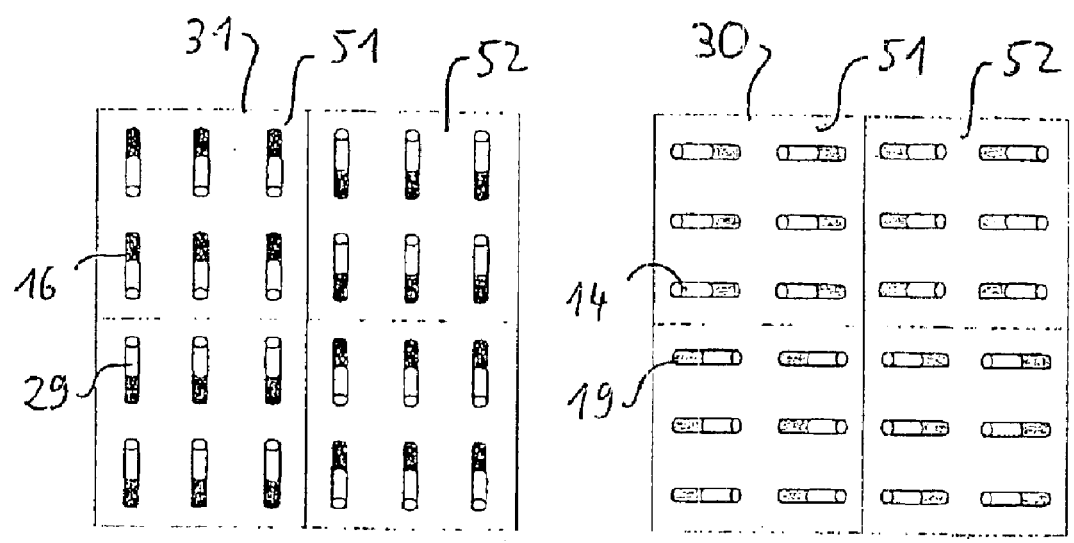
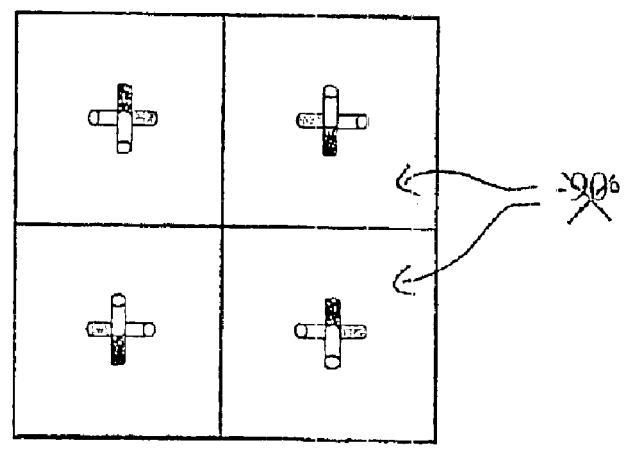
Fig. 5

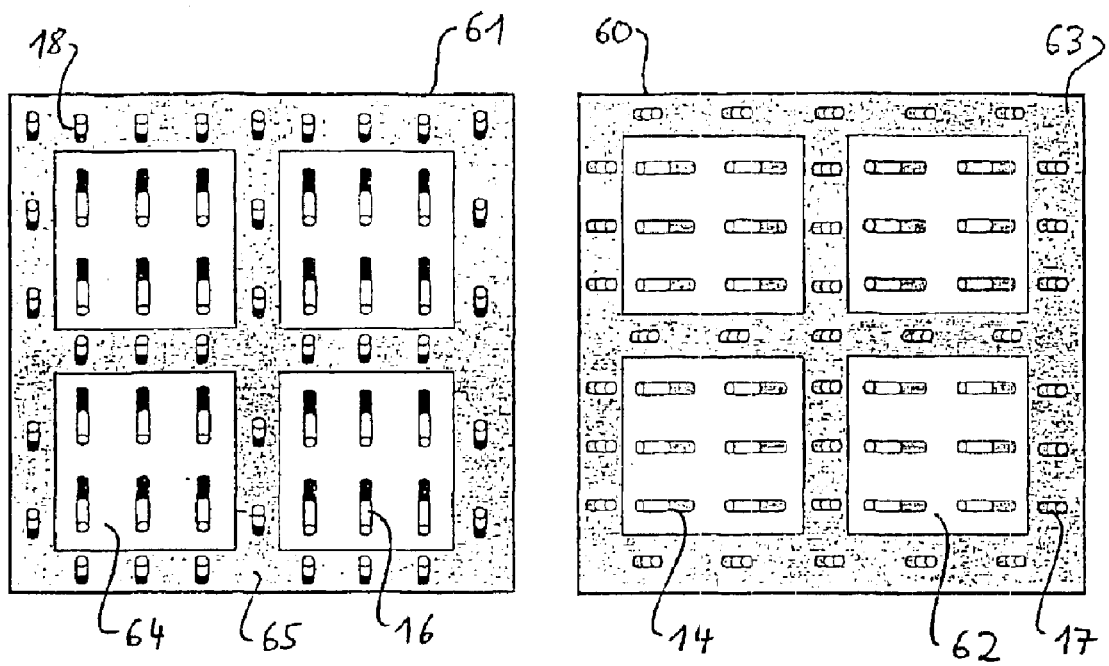
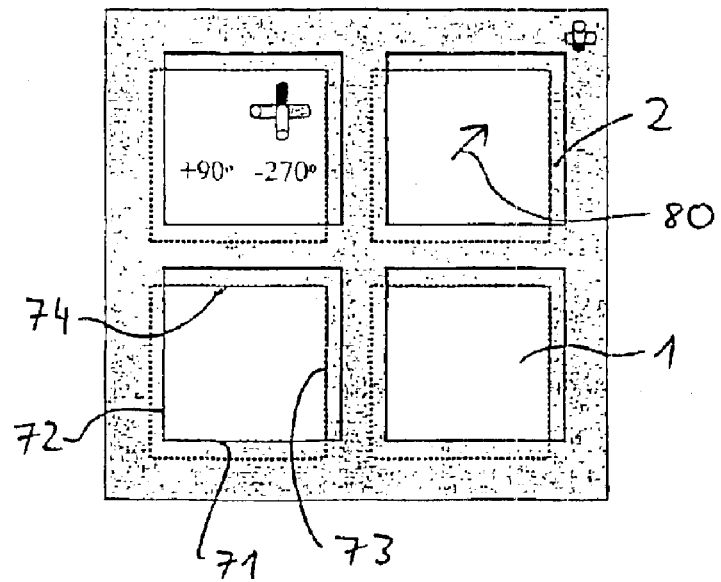
Fig. 9

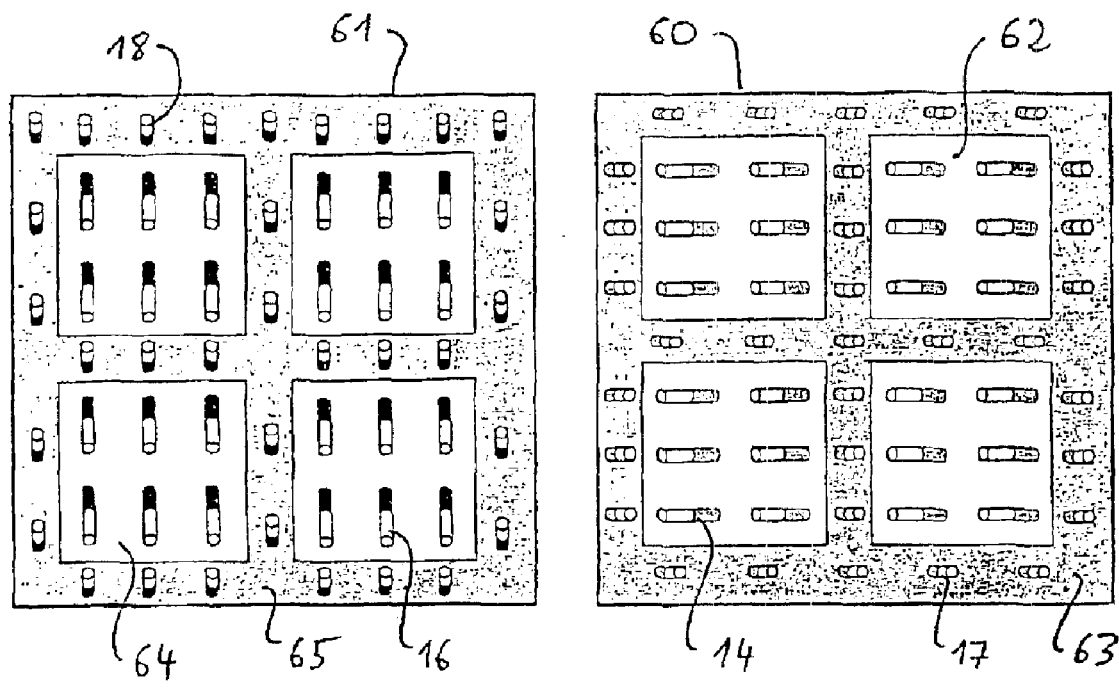
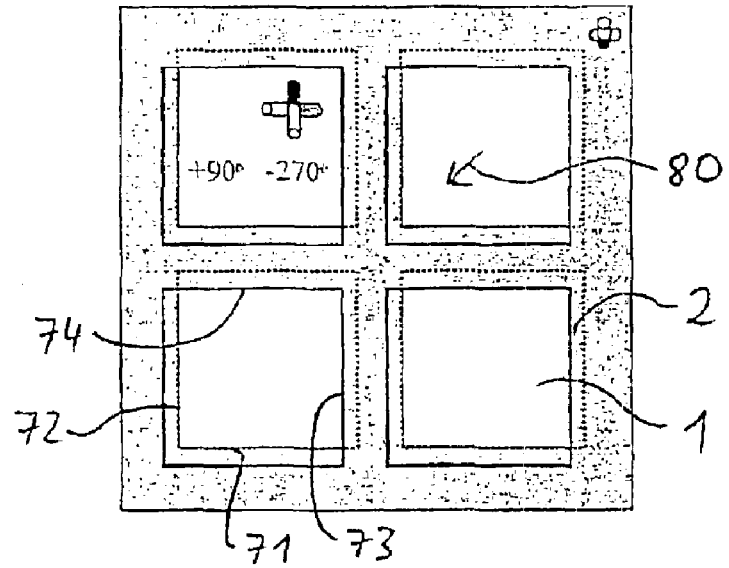
Fig. 10

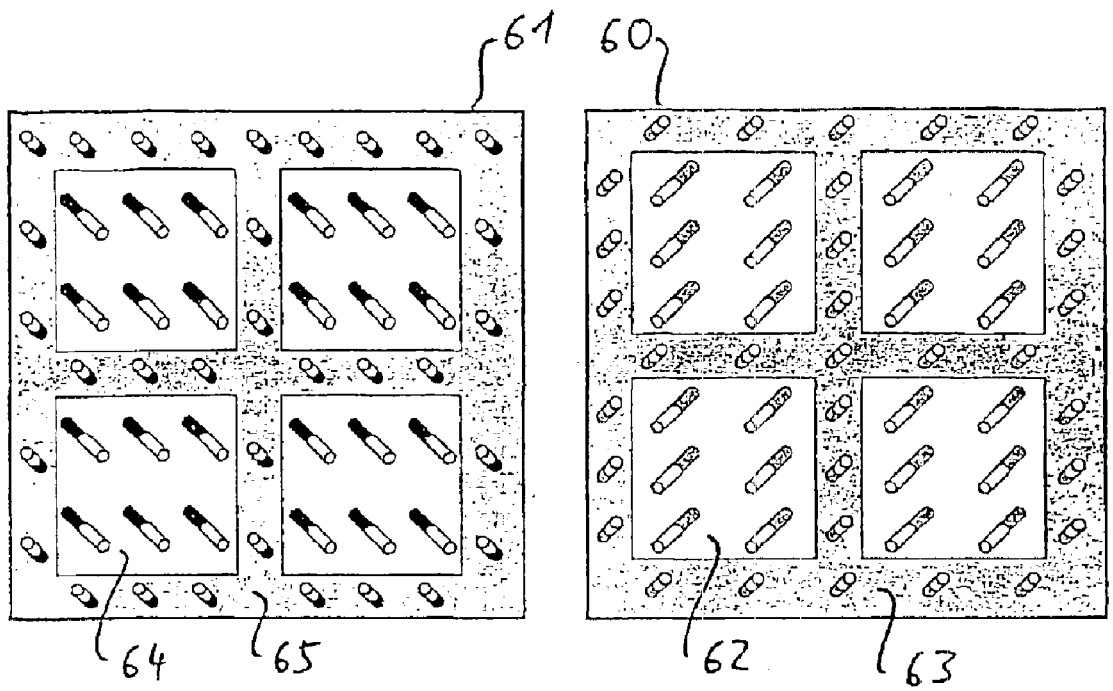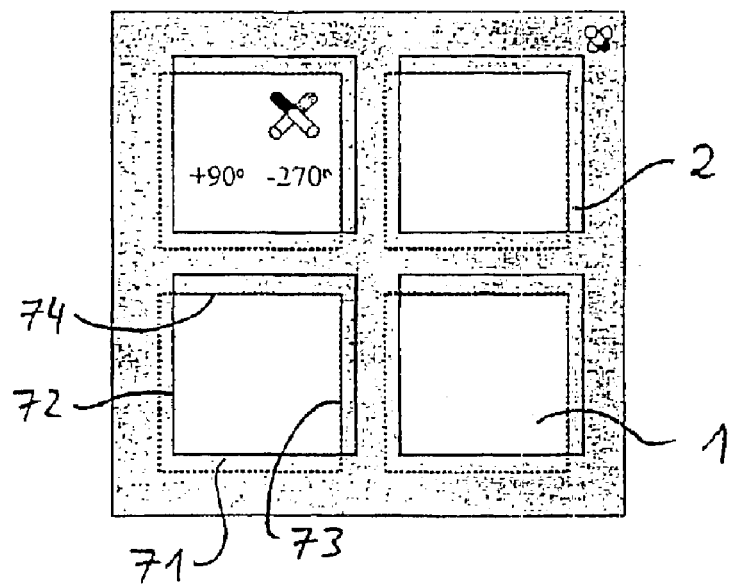
Fig. 11

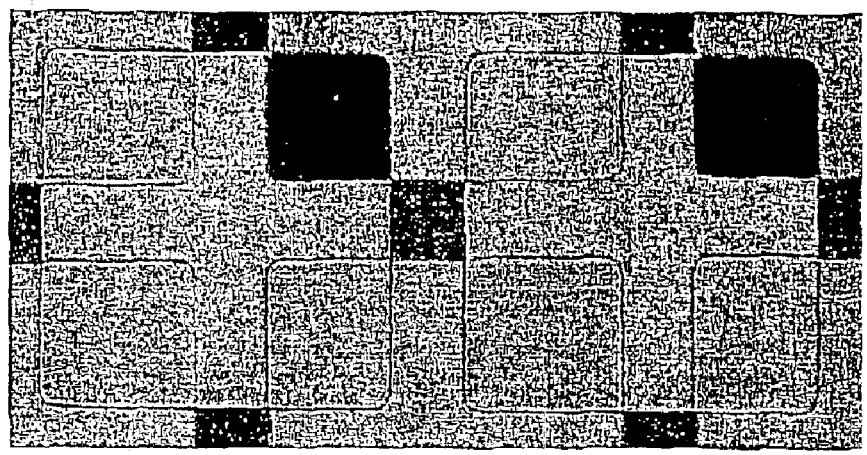
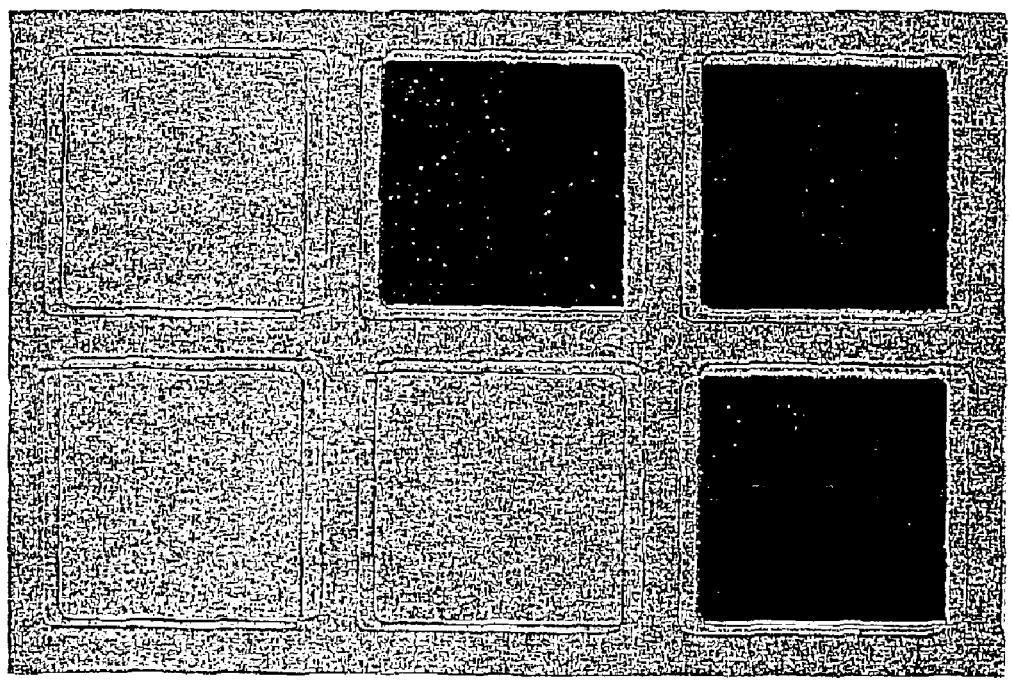
Fig. 13

NEMATIC LIQUID CRYSTAL ELECTROOPTICAL ELEMENT AND DEVICE

This application is a national stage filing under 35 U.S.C. § 371 of International Application No. PCT/CH01/00412, filed on Jul. 3, 2001, which published in the English language. This application also claims the benefit of priority under 35 U.S.C. § 119(a) to EP Patent Application No. 00 810 592.6, filed on Jul. 5, 2000 and EP Patent Application No. 01 810 400.0, filed on Apr. 24, 2001.

The invention relates to nematic liquid crystal electrooptical elements and a display device using said elements.

In 1980 Berreman demonstrated temporary bistability in twisted nematic LC cells. 15 years later Tanaka showed a novel addressing scheme which shortens the display addressing and response time. A corresponding temporarily bistable twisted nematic (BTN) element is disclosed in EP 0 579 247.

Berreman's cells are based on the potential of chirally doped nematic LC molecules to align in different twist configurations, when sandwiched between two substrates with suitable alignment layers. Such cells show three relevant configurations: an energetic ground state $\Phi_0$ characterised by the twist angle $\Phi_0$; a first metastable state $\Phi_1$ with a twist of $\Phi_1=\Phi_0-180°$; and a second metastable state $\Phi_2$ with a twist of $\Phi_2=\Phi_0+180°$.

Berreman focused his work on cells with a twist of $\Phi_0=180°$ in the ground state, where the orientation layers at the two substrates are parallel aligned and exhibit parallel pretilt angles. Due to the parallel pretilt angles on the two uniaxially aligned substrates, the ground state $\Phi_0$ is splay deformed. With an adequate electrical reset pulse applied to the cell, the positive dielectric anisotropic liquid crystal molecules align parallel to the electric field which leads to an almost homeotropic alignment. Upon applying an additional electrical pulse or by adequately switching off the reset pulse (fast or slow switch-off), the display relaxes either into the higher twisted state (fast switch-off), or into the lower twisted state (slow switch-off). Depending on the sign of the chiral dopant the lower twisted state can be either $\Phi_1$ or $\Phi_2$. In the following we will therefore designate the lower twisted state by $\Phi_-$ and the higher twisted state by $\Phi_+$. The two metastable states $\Phi_+$ and $\Phi_-$ can optically be distinguished between two polarizers which are properly aligned.

Figure 1:
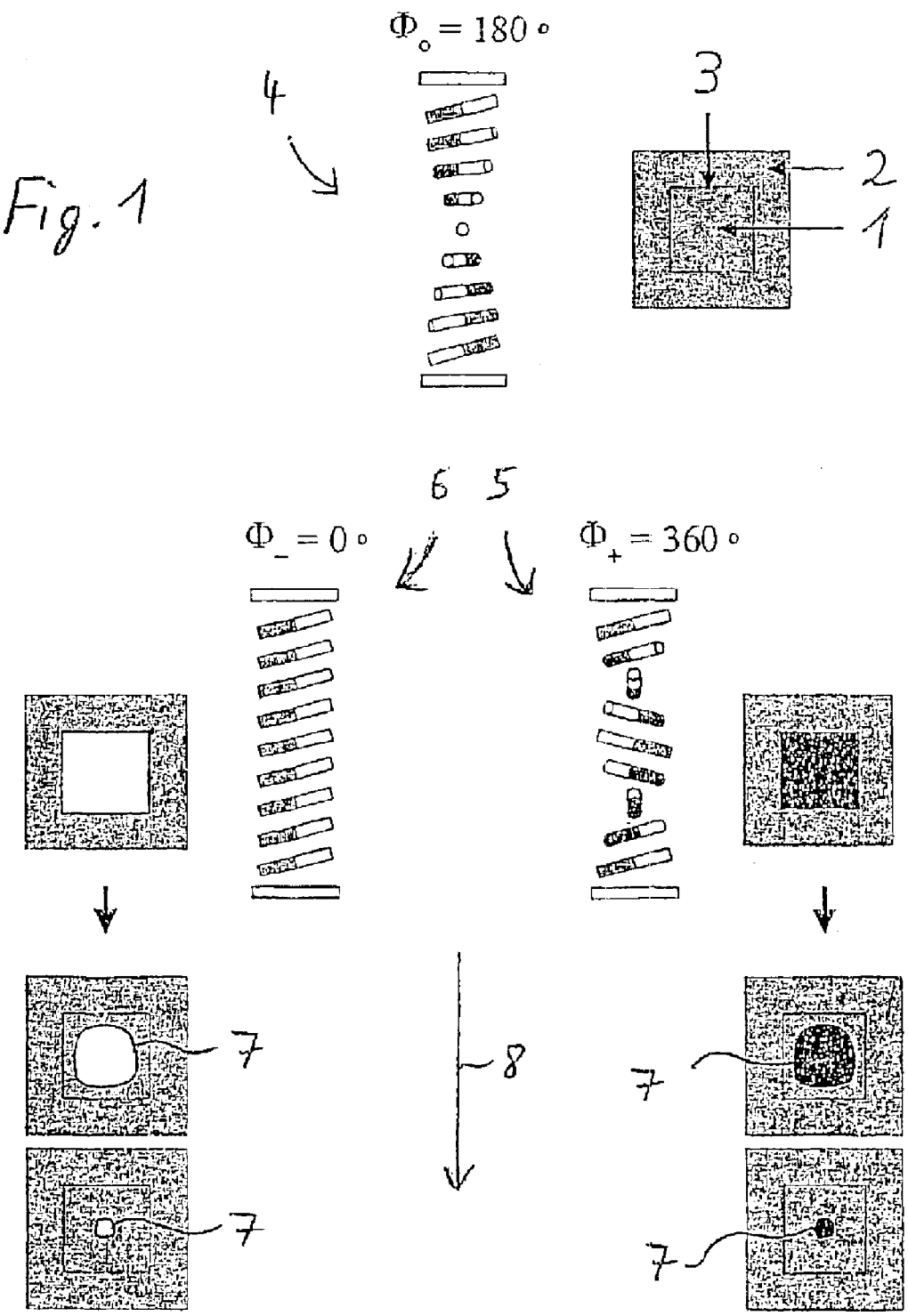

FIG. 1 shows the principle of a temporarily bistable twisted nematic (BTN) cell according to the prior art. There is a pixel area 1, which is defined by the transparent electrode 3. The area outside the pixel 1, the non-pixel area is called frame or border area 2. In both areas 1 and 2 there exist the same ground state configuration $\Phi_0$, numeral 4. When a strong reset pulse is applied to the cell the liquid crystal relaxes into one of the two metastable states $\Phi_+$ (5) and $\Phi_-$ (6). As a consequence of the adjacent different molecular configurations a disclination line 7 forms around the switched area. The disclination line 7 is a consequence of the topological differences between the selected metastable state 5 or 6 and the ground state 4. After formation of a metastable state the ground state $\Phi_0$ (4) slowly moves into the pixel area 1 and the metastable state relaxes back into the ground state 4 again as can be seen in the different representations along the time axis 8. The speed with which the ground state 4 returns is typically of the order of a couple of micrometers per second. For applications which do not require long-term bistability the metastable states 5, 6 of such BTN-cells exist long enough to allow time multiplexing of BTN-cells with adequate driving pulses (see e.g. T. Tanaka, Y. Sato, A. Inoue, Y. Momose, H. Nomura and S. Iino, Asia Display 259 (1995)).

A zenithal bistable display (ZBD) is disclosed in WO 97/14990. ZBDs are made by sandwiching a nematic liquid crystal layer between two transparent, conducting substrates of which one is homeotropically aligned in a conventional manner by using homeotropic surfactants, whereas the other exhibits a surface grating which is overcoated with a homeotropic surfactant. The period of the surface grating is of the order of 1 micrometer and the grating amplitude is 2 to 3 times the grating period. ZBDs enable to switch the liquid crystal in the cell between a homeotropic- and a homeotropic/planar hybrid state. ZBDs exhibit good mechanical stability. Manufacturing of the thin surface gratings such that reproducible and defect free alignment results remains a challenge.

WO 97/17632 discloses bistable nematic displays which switch between a 0° and a 180° twist configuration. A typical display comprises two opposite alignment layers with identical azimuthal alignment directions but distinct and different pretilt angles and anchoring energies. By applying proper electrical pulses it is possible to switch the display between a parallel (0°) and a 180° twisted state. The bistability requires proper balance of the elastic energies of the two states. This is done by doping the liquid crystal with a chiral additive. Since switching of the display crucially depends on the individual anchoring strength of the two alignment layers and because the anchoring strength changes under thermal and optical stress, the bistable performance of the display is very sensitive.

The use of nematic molecular configurations have the advantage that they can be reliably aligned at display boundaries. After switching off the driving voltage of a nematic display, it's electric field-induced on-state molecular configuration reliably returns into the off-state alignment state—even after having exposed the liquid crystal display (LCD) to temperature- or mechanical shocks. However, this is also the cause for their optical mono-stability which causes the displayed image to erase upon switching the driving voltage off. Mono-stability is a severe disadvantage of nematic LCDs in applications which require very low power consumption, and/or the reproduction of images with high information content without use of thin-film transistors (TFT) in display substrates.

Turning the display voltage of a mono-stable LCD off causes it's on-state molecular configuration to relax via elastic restoring forces back into the field-free off-state. Prerequisite to display an image requires therefore to maintain an electric field across each picture element (pixel) of a mono-stable display during the view time (frame time). Therefore, the display has to be constantly addressed with driving voltages which deform the off-state molecular configuration of the electro-optical effect on which the LCD is based such that the desired image is generated. To solve this problem, elaborate TFTs are integrated in high information content nematic LCDs into each pixel on one of the two glass substrates of a display. The TFTs act as electronic storage and addressing elements which render the pixels of the display at least temporarily optically bistable. In combination with the storage capacitance of each pixel, the TFT switches maintain the proper voltage across each pixel during the frame time and prevent the molecules to relax back into their off-state. Since manufacturing of TFTs is very elaborate, high information content LCDs, such as for computer monitors, are expensive and restricted to the most sophisticated display applications. Moreover, TFT manufacturing requires high temperature process steps which are not compatible with plastic substrates. Therefore, integration of TFTs into plastic LCDs to enable high information content plastic LCDs made by roll to roll processes is unlikely to occur.

It is therefore an object of the invention to provide a nematic liquid crystal electrooptical element which is long-term bistable, i.e. to combine the reliable alignment of the nematic elements with the low-power consumption of bistable elements.

The nematic liquid crystal electrooptical element according to the invention uses the characterising features of claim 1.

This element uses a new electro-optical effect with inherent optical bistability based on nematic molecular configurations inheriting the favourable properties of these liquid crystals. Because the optical information is stored in one of the two optical states of a bistable LCD without requiring electronic refreshing as long as the displayed information is not changed, the power consumption of bistable LCDs is minimal.

The domain stabilised bistable twisted nematic (D-BTN) liquid crystal element according to the invention does not only show a significantly enhanced bistability but also better electro-optical performance and multiplexability.

The proposed domain stabilisation in D-BTN-LCDs efficiently suppresses the unwanted ground state and allows long-term bistability and leads to excellent electro-optical performance, reproducibility and life-time of bistable nematic displays due to the novel alignment geometries.

Passive matrix addressed D-BTN-LCDs may exhibit short response times, fast addressing speed and large multiplexing ratios. Since no disclination lines have to be dislocated upon switching D-BTN-LCDs only comparatively weak reset pulses are required.

The combination of both cited advantageous properties allows the fabrication of high information content displays with a fast update rate (video frame rate). Because of the intrinsic bistability of a D-BTN display, only that part of the display image needs to be updated where the image has changed. This partial display image update leads to higher update rates. Especially in the case of slow moving images a very low power consumption results because the update rate is not a fixed, periodic process but can be done on demand any second, minute, hour or day. In-between these refresh cycles there is no power consumption. The last updated display image is always present and does not need any further electrical powering.

The liquid crystal display device according to the invention uses the characterising features of claims 24 and 25.

Figure 2:
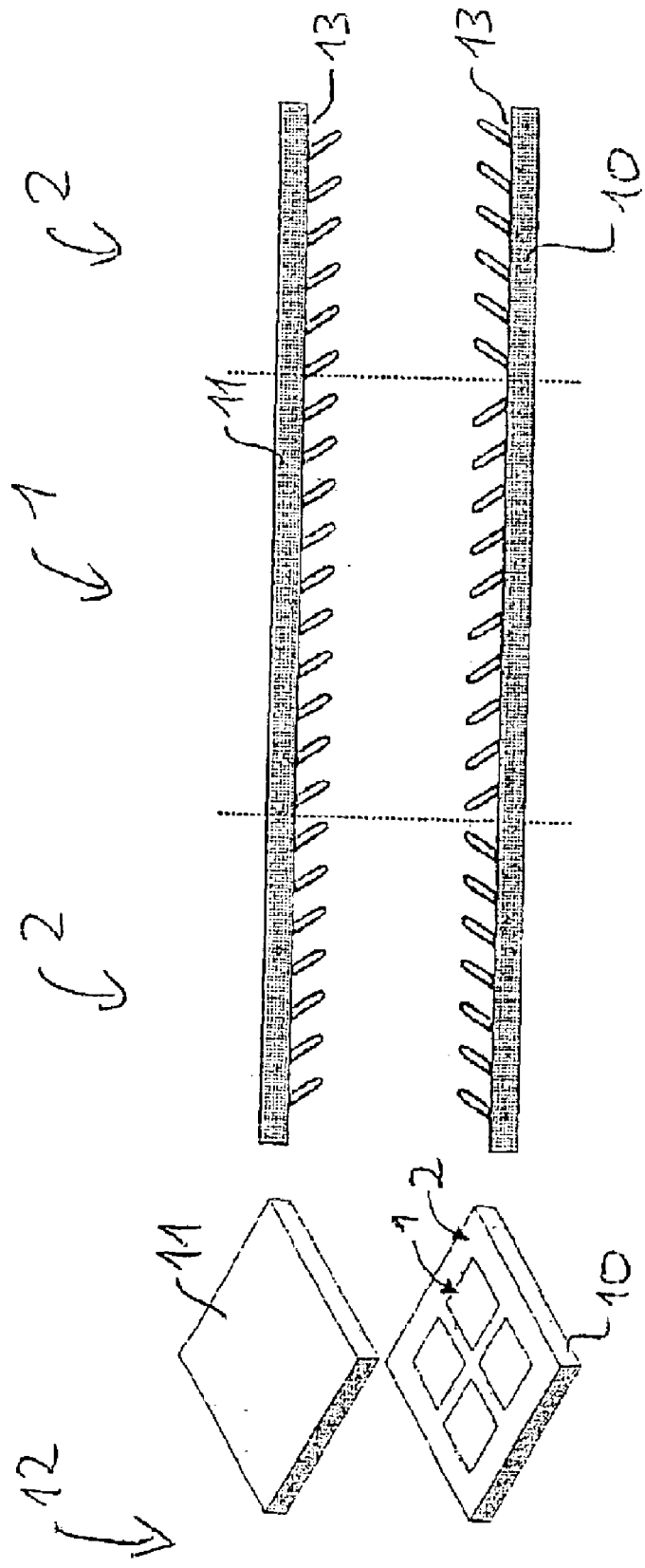
Figure 3:
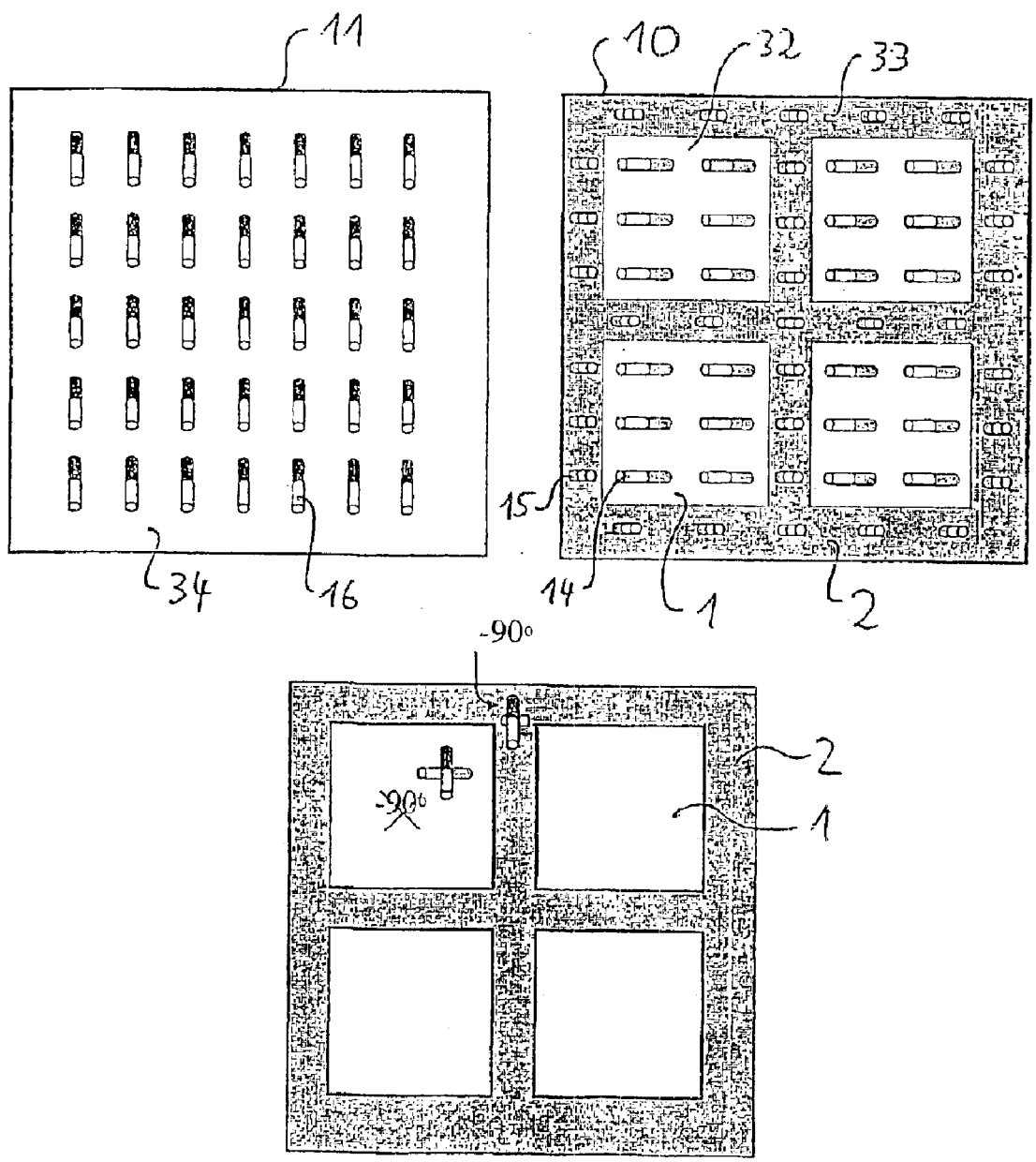
Figure 4:
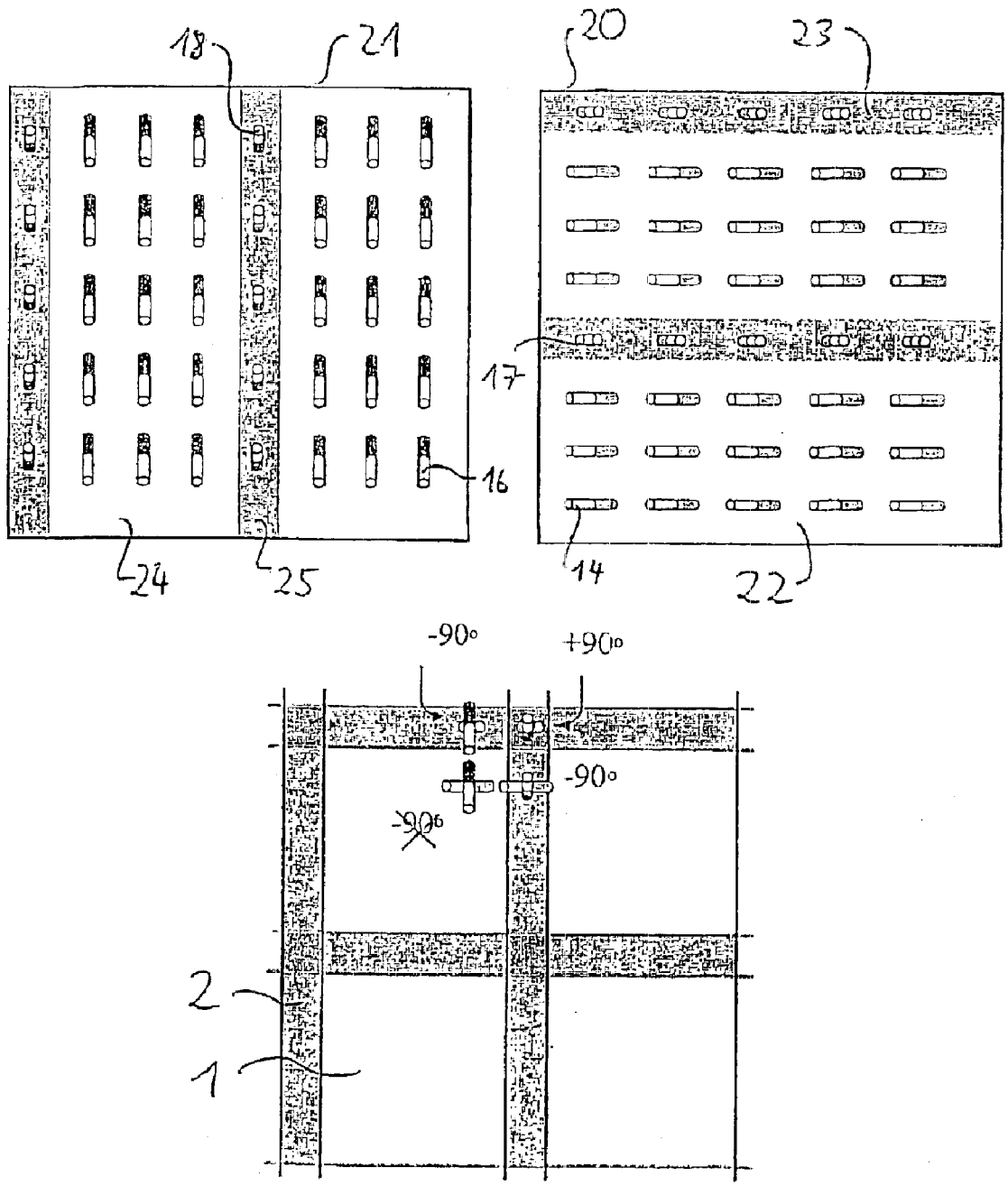
Figure 6:
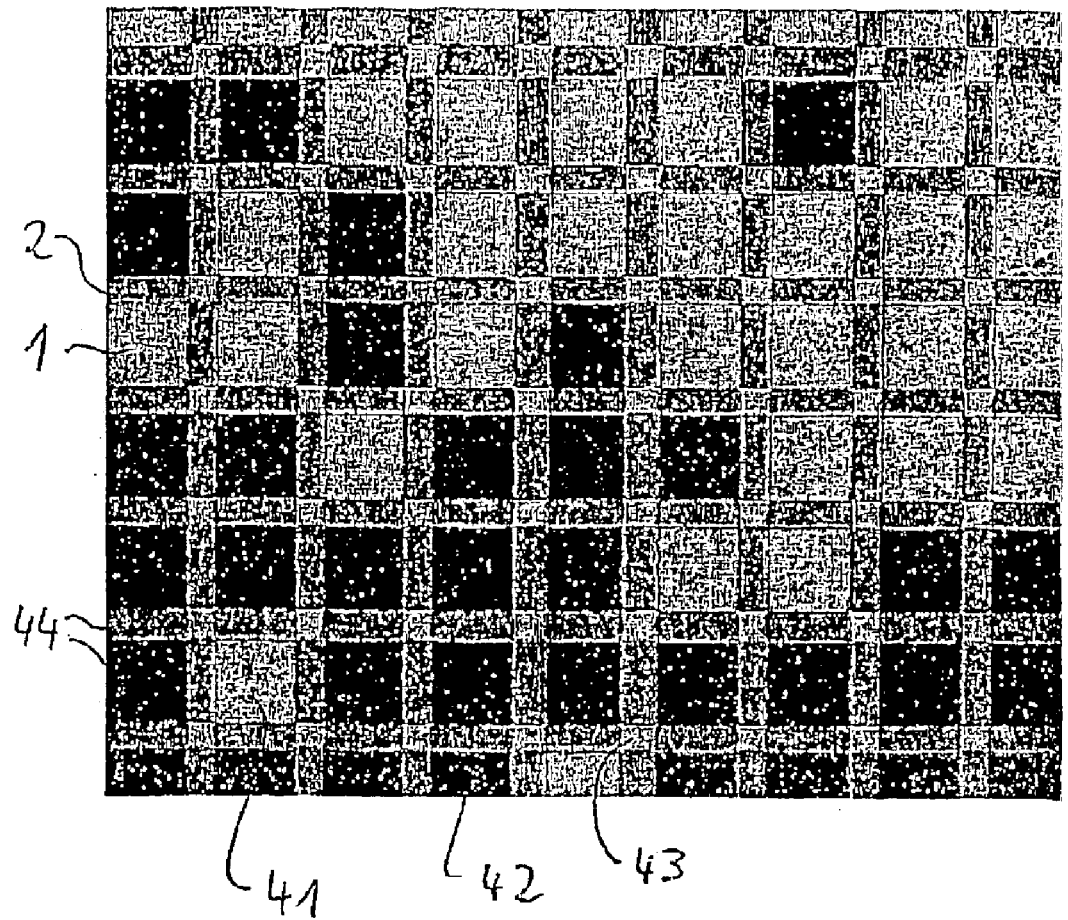
Figure 7:
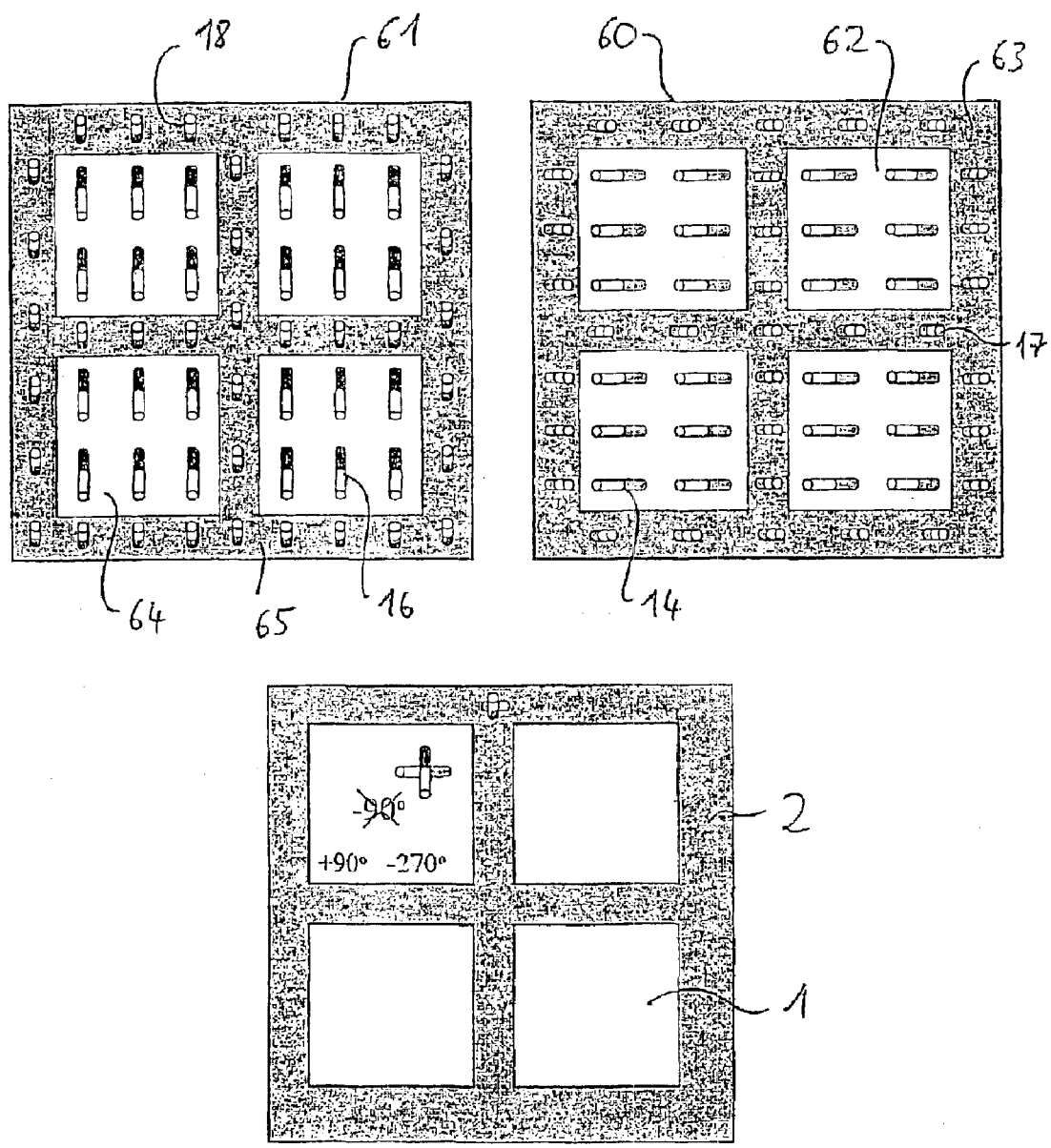
Figure 8:
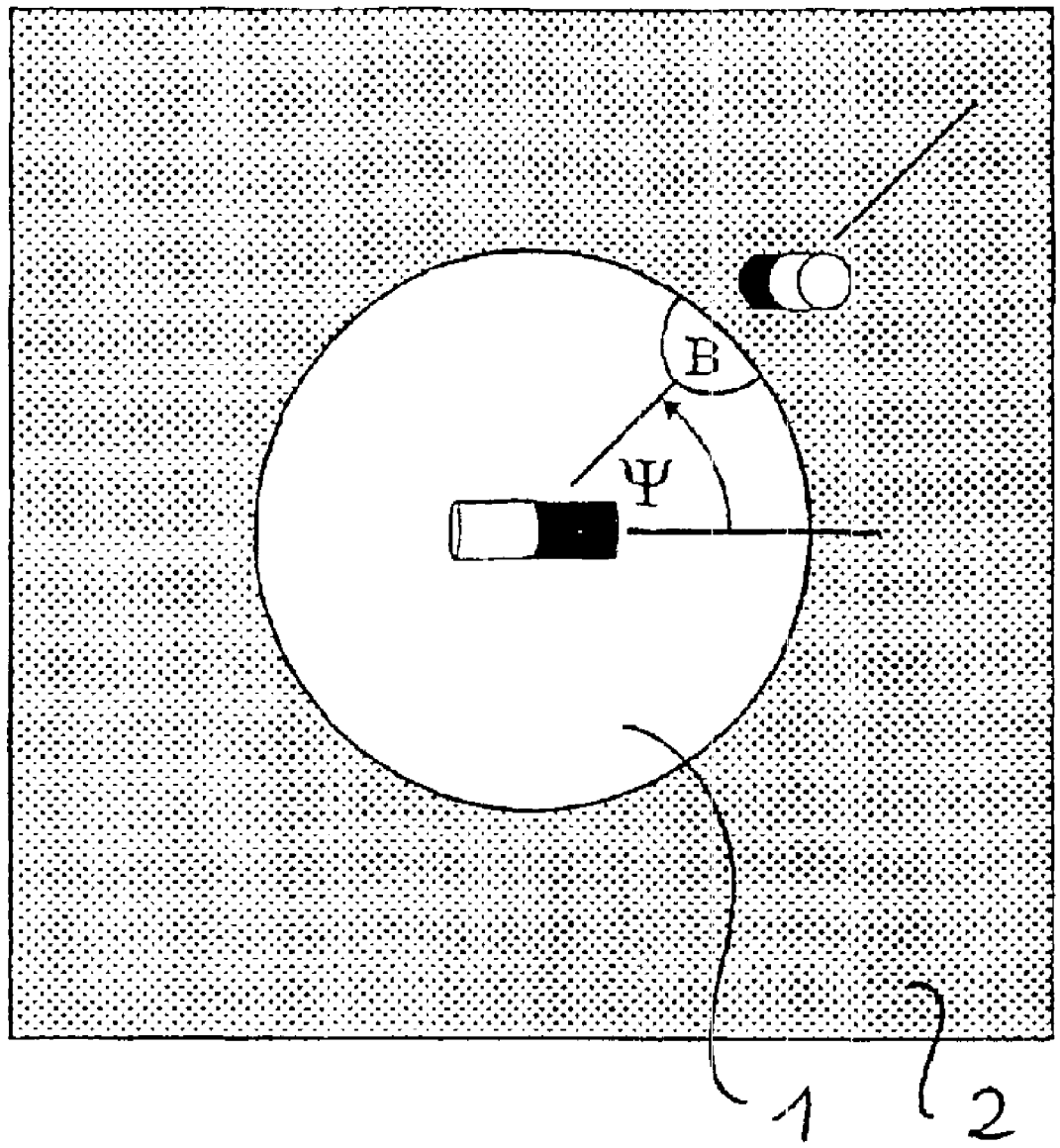
Figure 12:
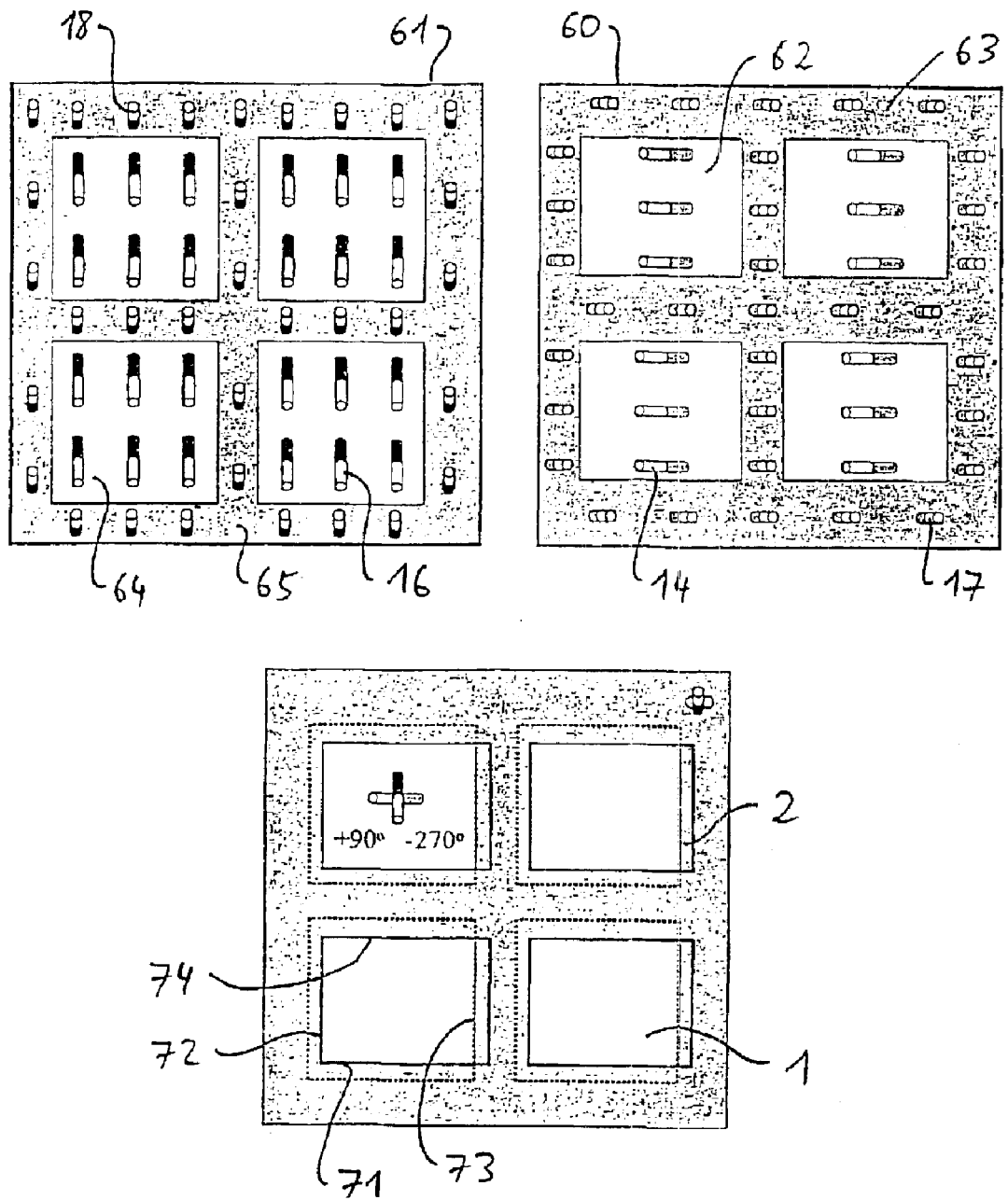
Figure 14:
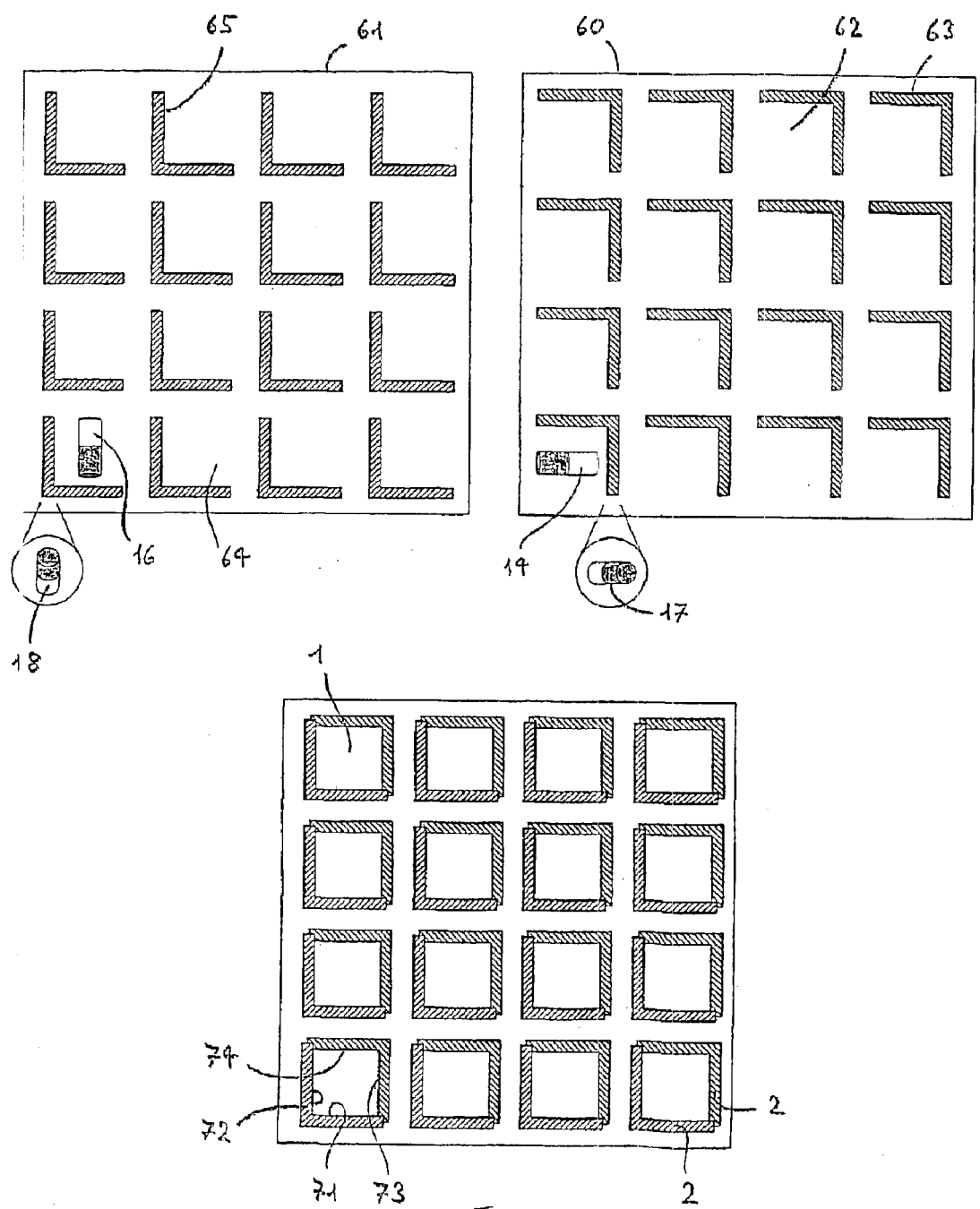

These and other objects, features and advantages of the invention will become more apparent in light of the following detailed description of embodiments thereof, as illustrated in the accompanying drawings, in which is shown in:

FIG. 1 a schematic view on a temporarily bistable twisted nematic cell according to the prior art;

FIG. 2 an illustration of a domain stabilised nematic liquid crystal device according to the invention with one patterned substrate;

FIG. 3 an example of bottom and top alignment layer of a domain stabilised nematic liquid crystal device according to the invention with one patterned substrate and the resulting cell with the interface LC molecule orientations;

FIG. 4 an example of bottom and top alignment layer of a further embodiment of a domain stabilised nematic liquid crystal device according to the invention with two patterned substrates and the resulting cell with the interface LC molecule orientations;

FIG. 5 an example of bottom and top alignment layer of a yet another embodiment of a domain stabilised nematic liquid crystal device according to the invention with pixel to pixel stabilisation and the resulting cell with the interface LC molecule orientations;

FIG. 6 higher (dark) and lower (bright) twisted state pixels of a cell according to the invention, observed through a 490 nm interference filter;

FIG. 7 an example of bottom and top alignment layer of still a further embodiment of a domain stabilised nematic liquid crystal device according to the invention with two patterned substrates and the resulting cell with the interface LC molecule orientations;

FIG. 8 an example of a circularly shaped pixel on a bottom alignment layer (top view);

FIG. 9 an example of bottom and top alignment layer of still a further embodiment of a domain stabilised nematic liquid crystal device according to the invention with two patterned substrates and the resulting cell with the interface LC molecule orientations;

FIG. 10 an example of bottom and top alignment layer of still a further embodiment of a domain stabilised nematic liquid crystal device according to the invention with two patterned substrates and the resulting cell with the interface LC molecule orientations;

FIG. 11 an example of bottom and top alignment layer of still a further embodiment of a domain stabilised nematic liquid crystal device according to the invention with two patterned substrates and the resulting cell with the interface LC molecule orientations;

FIG. 12 an example of bottom and top alignment layer of still a further embodiment of a domain stabilised nematic liquid crystal device according to the invention with two patterned substrates and the resulting cell with the interface LC molecule orientations;

FIG. 13 two pictures of fabricated devices placed between a polarizer and an analyzer, wherein the upper picture illustrates the different mechanical stability in a fabricated device with different types of pixels and the lower picture shows an example of a device fabricated with two patterned alignment substrates slightly mutually shifted against each other; and FIG. 14 an example of bottom (left) and top alignment layer (right) of still a further embodiment of a domain stabilized nematic liquid crystal device according to the invention with two patterned substrates and the resulting cell with the adjusted stabilization domains forming the pixel areas.

The current invention focuses on novel means and molecular configurations to achieve long-term stabilisation of bistable nematic liquid crystal displays.

All optical bistable liquid crystal displays—smectic, cholesteric, or nematic—reported so far are characterised by global alignment layers; i.e. the alignment of the display extends uniformly over the entire area of both display substrates; where the alignment direction may differ on each substrate.

In contrast, the present invention chooses a new approach to achieve bistability in generally twisted nematic LCDs by using non-global alignment geometries. This approach surprisingly enables long term stable and reproducible bistable operation of nematic LCDs.

Patterned alignment layers on either one, or both substrates of nematic displays enables to generate different LC-configurations which coexist simultaneously and which induce bistability in a pre-defined pixel area (in contrast to the temporary bistability of the nematic displays known so far). In the following the principle of this novel type of nematic bistability, denominated domain stabilised BTN (D-BTN), will be described.

FIG. 2 shows a perspective view of a domain stabilised nematic liquid cell 12 with 2×2 elements with one patterned substrate 10 and a cross-section through the device. Pixel Areas 1 and frame areas 2 are referenced in the same way as in FIG. 1.

Typically a first domain configuration governs the pixel areas 1, whereas the area outside the pixels—i.e. the border or frame area 2—defines a second domain, which is governed by different molecular configurations. This additional border domain outside the pixel provides the target configuration in the pixel area 1 the stability. As can be seen from the cross-section, pixel area 1 and frame area 2 of the patterned substrate 10 retain different azimuthal and pretilt orientation.

It is to be noted that the invention includes also the case, where in the immediate neighbourhood of a pixel area 1 there are other pixels instead of the border domain. The molecular configuration of the neighbour pixels for instance could correspond, except for a symmetry operation (mirror, rotation or combination), to the molecular configuration of the pixel area 1.

Since the border domains between the pixel 1 can be hidden with black matrices, the border LC-configurations can be optimised for bistability regardless of their optical properties. Upon applying appropriate voltages to the pixels 1 of such domain stabilised BTN-displays they switch between different bistable states. Each pixel 1 exhibits a sufficient degree of bistability to allow for high multiplexing rates and/or electrically erasable optical image storage.

A display cell 12 according to the invention, as in FIG. 2, consists of at least one substrate 10 with different alignment directions (regarding either azimuth or pretilt or both) at the substrate interfaces 13 which suppresses the growth of the $\Phi_0$ ground state 4 in the pixel area 1 and therefore stabilises the two metastable states $\Phi_+$ 5 and $\Phi_-$ 6. Therefore the $\Phi_+$ and $\Phi_-$ states are referred to as the bistable states 5 and 6 of the D-BTN display 10, using the same numerals.

The alignment orientation in the pixel area 1 of a D-BTN display 10 corresponds with the global orientation of conventional BTN cells. In border areas 2 between pixels 1, or more generally, in the areas adjacent the respective pixel 1 different alignment directions are generated.

FIG. 3 shows a top view of the individual substrates 10 and 11 of FIG. 2 and their combination, together with the relevant LC molecular orientations 14, 15 and 16 at the substrate interfaces 13. The configuration leads to two domains (frame area 2 and pixel area 1), which are the result of the alignment pattern on the bottom substrate 10 and a globally aligned upper substrate 11.

FIG. 4 shows another embodiment of a D-BTN-LCD consisting of a two domain alignment layer on both substrates 20 and 21. Substrate 20 and substrate 21 comprise stripes 22, 23 and 24, 25, respectively, with different alignment directions. By using substrates 20 and 21 to build a cell, pixel areas 1 are created with portions of stripes 22 and 24, whereas frame areas 2 are created through portions of stripes 22 and 25, 23 and 24 and 23 and 25, i.e. wherein at least one substrate portion 20 or 21 comprises the alignment according to the smaller stripes 23 and 25. Therefore only the combination of stripes 22 and 24 contribute to the existence of pixel areas 1 whereas the existence of one of the stripes 23 or 25 contribute to frame areas 2.

A particularly suitable technique to realise the required alignment configurations 14, 15 and 16 are photo-alignment methods. Such methods use irradiation with—usually polarised—light to induce alignment capability in a corresponding orientation layer. Apart from the advantage of avoiding the problems inherent in the rubbing process, with these photo-orientation methods it is possible to provide areas having different orientation and thus to structure the orientation layer.

A prerequisite for the applicability of a photo-alignment method to the present invention is their ability to generate not only azimuthal orientation but also bias tilt (pretilt).

One such method, which will be advantageously used for the present invention, is the linear photopolymerization (LPP) method, also sometimes referred to as photooriented polymer network (PPN). It is described for instance in U.S. Pat. No. 5,389,698, U.S. Pat. No. 5,838,407 and EP 0 756 193. An overview of the method can also be found in M. Schadt, K. Schmitt, V. Kozenkov and V. Chigrinov, Jap. Journal Appl. Phys. 31, 2155 (1992), or in M. Schadt, H. Seiberle and A. Schuster, Nature 381, 212 (1996). Those photo-oriented polymer networks can be used wherever structured or unstructured liquid crystal orientation layers are required.

Polymers that are suitable for the formation of such photostructured orientation layers for liquid crystals are for instance described in WO-A-96/10049 and EP-A-0763552. With these compounds on irradiation with linearly polarised light it is possible, in addition to inducing the desired orientation, simultaneously to induce an angle of tilt. It is thus possible to produce layers having structuring in respect of azimuthal orientation and angle of tilt.

The domain stabilised displays of the present invention do not necessarily require photo-aligned boundaries, they could also be realised with alternative alignment techniques. For instance with sophisticated rubbing or evaporation techniques, provided two different alignment directions and the necessary pretilt angle can be achieved. Photo-alignment is thus not a prerequisite for fabricating D-BTN displays, however, it makes the fabrication process much easier.

The proposed domain alignment layers can also be used to further enhance the angle of view of D-BTN displays by subdividing pixels into sub-pixels.

The following description relates to examples of cells, starting with a D-BTN-LCD with photo-aligned domain orientation pattern on one cell substrate switching between the two bistable twist states +90° and −270° (Example 1), shown in FIG. 3.

The D-BTN-LCD cells made consist of a base substrate 10 and a cover substrate 11. Both substrates 10 and 11 retain transparent electrodes and photo-alignment layers. The transparent ITO electrodes are uniform over an area of 8×8 mm$^2$ comprising many pixels of either size 200×400 $\mu$m$^2$ size or 600×1000 $\mu$m$^2$.

The two-domain photo-alignment layer 32 and 33 on the base substrate 10 induces two different LC orientations, one within the pixel area 1 and the other within the surrounding border area 2. The upper substrate 34 is uniaxially photo-aligned in one direction over the entire area.

The photo-alignment layers are typically 50 nm thin and the LPP photopolymer JP265 from Ciba Speciality Chemicals Ltd. is used, in the form of a solution of 2% photopolymer desolved in cyclopentanon. The liquid crystal mixture is a supertwisted nematic (STN) mixture with a birefringence of 0.129, available under the name MLC 14000 from Merck Ltd. To obtain the desired intrinsic twist configuration the LC mixture is doped with the negative handed chiral additive ST9 of Merck Ltd. The cell gap is 5.1 $\mu$m and a chiral concentration of 0.58% (wt) was chosen, which results in a d/P ratio of 0.3 (d=cell gap, P=helical pitch).

The LPP-photo-alignment material was applied by spin coating 30 seconds with 3000 rpm and then baked on a hot plate at 150° C. for 30 minutes. The LPP coated substrates were illuminated with a Karl-Suess UV-exposure lamp equipped with a 350 W Mercury bulb and a UV-polarizer. The UV-light intensity at 310 nm is 0.8 mW/cm². The substrates were exposed to linearly polarized UV light under a polar angle of 35° with respect to the substrate normal for all here described exposures. To generate the two-domain alignment of FIG. 3 on the base (lower) substrate 10, the substrate 10 was in a first step exposed to UV light for 135 seconds, while masking the frame area with a chromium mask. The azimuthal orientation of the linearly polarized light was parallel to one of the pixel boundaries and defined as 0°. In a second exposure step, the mask was removed and the entire substrate exposed for 15 seconds, again under a polar angle of 35°, under the azimuthal angle of 180°. From other experiments it is estimated, that the resulting pretilt angles were between 5° and 10° (see numeral 14) in the pixel area 1 and about 70° (see numeral 15) in the frame area 2. The top substrate was exposed for 150 seconds which leads to an estimated uniform pretilt angle of between 5° and 10°; the corresponding azimuthal angle was +90° (see numeral 16 in comparison to 14 and 15). Thus in the pixel area the chirally negative doped LC together with the azimuthal orientation of the alignment layer favours a twist angle of −90° ($\Phi_0$=−90°=the ground state), whereas the pretilt angles support a twist of either +90° or −270° (i.e., [$\Phi_0$=−90°] ±180° are the two bistable states).

After filling the D-BTN cell with the LC mixture in near isotropic phase at 115° C. and cooling it to room temperature, a major part of the cell is covered with disclinations. The two following methods were applied to get to the wanted pixel configurations.

By applying an electrical sinusoidal pulse of 10 ms duration and a voltage of 50 Vrms to the cell at room temperature, the pixels go into the lower twisted bistable state (+90°).

By applying an electric sinusoidal AC field of 38 Vrms for two seconds at 65° C. all ground-state pixels go into the +90° bistable state and the disturbing disclination lines disappear.

It is presumed that between the border domain, which is in a stable ground state and does not substantially change its LC configuration while switching, and the switchable pixel domain, a disclination line forms. The disclination line is located at the edges of the photo-patterned pixel and prevents the ground state from flowing into the pixel area.

Switching between the two bistable states can be achieved with various types of pulses. To demonstrate bistability here simple pulse forms were chosen. Switching into the higher twisted state (−270°) is done with a 500 µs sinusoidal pulse of 21 Vrms. An optical switching time of 100 ms results. Switching into the lower twisted state can be achieved with a saw-tooth pulse of 5 V (peak value), with a short rise time of about 100 µs or less and a decay time of about 60 ms. Such a pulse results in an optical switching time of 230 ms. The lower twisted pixel state exhibits a green interference colour, for parallel polarizers and with the alignment layer orientation of the D-BTN cell parallel to the polarizers. The colour of the higher twisted state appears red for the same polarizer configuration.

For a possible adjustment of the colours, various methods are known to the skilled person. For instance, with a good choice of the optical retardation Δnd of the LC layer, with internal or external optical compensation films and proper orientation of the polarizers the two interference colours can be modified such that a black and white display results. Furthermore, using a thinner LC layer a much faster response time results. Together with the BTN's potential for fast high multiplexable addressing schemes a high information content display can be fabricate with the D-BTN concept which allows video-up-date rate.

Sample cells made as described above have maintained their bistability over the whole observation period, which usually was several months.

FIG. 4 shows a schematic view of Example 2, a D-BTN LCD with a photo-aligned orientation pattern on both cell substrates 20 and 21 switching between the two bistable twist states +90° and −270°. It shows the two-domain alignment pattern of the two substrates (in the upper part) as well as the combined substrates (in the lower part).

The D-BTN LCD cell of Example 2 was prepared in a similarly way as in Example 1. However, contrary to Example 1 both substrate surfaces 20 and 21 exhibit a two-domain photo-alignment layer in the form of stripes 22, 23 and 24, 25. Each alignment layer covers broader stripes 22 and 24, respectively, which build a pixel area of 100 µm, and narrower stripes 23 and 25, respectively, which build a frame area of 30 µm, with two different alignment directions in the two areas. The UV-exposure time was 135 seconds for the pixel area and 15 seconds for the frame area. Pretilt angles are estimated to be between 5° and 10° in the pixel area 1 (numeral 14 and 16) and about 70° in the frame area 2 (with at least one LC orientation according numeral 17 or 18).

As in Example 1, in the pixel area 1 the chirally negative doped LC together with the azimuthal orientation of the alignment layer favours a twist angle of −90° (ground state $\Phi_0$=−90°), whereas the pretilt angles support a twist of either +90° or −270° (the two bistable states).

An electric field treatment analogous to the one described in Example 1 is performed here as well in order to get the wanted bistable pixel configurations.

A 500 µs sinusoidal-pulse of 23 Vrms was used to switch the display into it's higher twisted state. An optical switching time of 80 ms results. Switching into the lower twisted state can be achieved with a saw-tooth pulse of 6 V (peak value), with a short rise time and a decay time of 40 ms. Such a pulse results in an optical switching time of 200 ms. The lower twisted pixel state exhibits an interference colour which is light blue under parallel polarizers and with the alignment layer orientation of the D-BTN cell at 45° with respect to the polarizers. The colour of the higher twisted state is red.

An illustration of the two bistable states of this partially switched fabricated display is shown in FIG. 6. It is observed through a blue 490 nm interference filter. The pixel colour of the lower twisted states 41 is light blue and pixel colour of the higher twisted states 42 is black. Furthermore, one can distinguish two different regions of the frame domain. At the corner 43 of the pixel areas 1 (i.e. the intersection points of the stripes 23 and 25 of the upper and lower substrate's alignment layers building the frame area 2), there is a region 43 with high tilt (c.f. FIG. 4), which appears bright between parallel polarizers. At the edges 44 (between two adjacent pixel areas 1), there is a region with medium tilt, which appears darker. Both regions 43 and 44 of the frame domain 2 have a very stable state. Additionally, a skilled person can also see the disclination lines separating the pixel areas 1 from the frame domains 2.

With a good choice of the Δnd of the LC layer, with internal or external optical compensation films and proper orientation of the polarizers the two interference colours can be modified such that a black and white display results. Using a thinner LC layer a much faster response time results. Together with the BTN's potential for fast high multiplexable addressing schemes a high information content display can be fabricate with the D-BTN concept which allows video-up-date rate.

In order to test the stability of the D-BTN cells, the devices were put under strong pressure such that LC-flow occurred. Under pressure the state with the lower energy appeared. This state can be controlled by adjusting the d/P ratio and the respective pretilt angles. Only very intense flow or very high electrical fields caused the ground state to occur again. This demonstrates the high degree of stabilisation of the bistable states against the formation of the ground state $\Phi_0$ in domain stabilised LC cells according to the invention.

FIG. 5 shows an example of a further embodiment of the invention. It is based on a pixel to pixel stabilisation in both substrates 30 and 31, that is, instead of an explicit frame area the configuration of the adjacent pixels 51, 52 is used to stabilise the two bistable states. The azimuthal orientation in the pixels is equal to the orientation of the pixel in Example 1 and results in a 90°/−270° type D-BTN cell. In order to achieve the proper alignment in neighbouring pixels 51, 52 the bottom and top substrates 30 and 31 are aligned with a single photo-mask according to procedure explained in Example 1. However in contrast to the Example 1 the two alignment layers have to be aligned against each other in such a way that adjacent pixel domains 51, 52 are positioned opposite to each other (see FIG. 5, numerals 14 and 19, 16 and 29). A very high fill factor for D-BTN LCDs results with this approach.

Still another embodiment of the invention is illustrated in FIG. 7. It represents a +90°/−270° ($\Phi_0 = -90°$) element that consists of a two-domain alignment layer on both substrates 60 and 61. Substrate 60 and substrate 61 comprise pixel areas 62, 64 and a frame areas 63, 65, with different alignment directions. The alignment layers of the two substrates are adjusted against each other in such a way that the pixel areas of the two substrates are positioned opposite to each other. The azimuthal and pretilt orientation in the pixel areas are similar to the orientation in a conventional BTN cell. By using such substrates the pretilt angle in the pixel domain and the pretilt angle in the frame domain can be chosen independently. This in contrast to the embodiments shown in FIG. 3 and FIG. 4. If for the embodiment illustrated in FIG. 3 a low pretilt in the pixel area 1 of the lower substrate 10 and a low pretilt in the uniaxially aligned upper substrate 11 and further a high pretilt in the frame area 2 on the substrate 10 is chosen, an intermediate average tilt angle results in the frame domain of the cell. The same is true for the embodiment shown in FIG. 4. In the embodiment shown in FIG. 7, advantageously a low pretilt angle in the pixel domain and a high pretilt angle in the frame domain can be chosen.

The domain stabilised approach to achieve bistable nematic LCDs according to the present invention may not only stabilise switchable domains in BTN cells, but also enables to stabilise cells which switch between a 0° C. and a 180° twist configuration, such as those described in the introductory part of this specification (the generalisation includes devices with twist angles $\Phi_0 \pm 90°$, with typically $\Phi_0 < 180°$). After switching a conventional 0°–180° twist cell, the switched domains usually show a random shape. With the present invention well defined areas can be obtained. The cell fabrication may be done according to Example 1 but the cover substrate is azimuthally oriented in such a way that in the pixel area the required configuration results. The size of the pixel is an important parameter when designing this type of cells.

The invention includes bistable cells which contain in-plane electrode geometries which allow to apply electric fields which are perpendicular to the substrates and fields which have components parallel to the substrate planes. Such electrodes allow to switch the cells in on direction ($\Phi_- \Rightarrow \Phi_+$ or $\Phi_- \Leftarrow \Phi_+$) or in both directions ($\Phi_- \Leftrightarrow \Phi_+$). As example could be cited the cell according to Example 1 with one or both electrodes partitioned.

The absolute value of the bias twist angle $|\Phi_0|$ (ground state) in the examples was always 90°. Generally, an absolute value of the bias twist angle $|\Phi_0| < 300°$ is preferred, but $|\Phi_0| \geq 300°$ could also be used. The twist difference angles $\Delta\Phi = \pm 180°$ mean, that $\Delta\Phi$ has a quantized size and is roughly $\pm 180°$ ($\Delta\Phi$ is $\Phi_0 - \Phi_+$ or $\Phi_0 - \Phi_-$ respectively).

Advantageously, the pretilt angle difference between adjacent areas of the pattern is in the range between 70° and 110°, preferably in the range between 80° and 100°, more preferably between 85° and 95°. The term "pretilt angle difference" means the difference angle between the vectors defined by the interface liquid crystal molecules retaining the predefined pretilt angle in adjacent areas of the pattern. As an example, if in FIG. 3 the pretilt angle were 10° in the pixel area 1 and 80° in the frame area 2, then the pretilt angle difference would be 90°.

The pretilt angle in the pixel area 1 is typically less than about 20° (on both substrate) but larger tilt angles could also be used. The pretilt angle in the frame area 2 is typically larger than about 45° but could also be smaller.

The absolute value of the bias twist angle $|\Phi_0|$ in the ±90° cells is typically $|\Phi_0| < 300°$ but $|\Phi_0| \geq 300°$ could also be used. The twist difference angle $\Delta\Phi = \pm 90°$ mean, that $\Delta\Phi$ has a quantized size and is roughly ±90°.

The size of the pixels 1 is typically a few 10 μm, for many applications preferably from 4 μm to 400 μm, but could be much smaller as well as much larger.

It is possible that the domain stabilisation as outlined in this description generates more than two stable states 5 and 6.

Domain stabilised cells according to the invention may in addition contain suitable internal or external optical compensation layers in order to improve brightness and/or contrast. These compensators can for instance comprise liquid crystalline thin films (uniaxial or twisted layers), stretched polymer films or of combinations of such films.

The present invention is applicable to transmissive and reflective displays. As substrates, preferably glass, plastic or CMOS may be used.

But also applications other than displays are possible. These include for instance electrooptical shutters and spatial light modulators.

An electrooptical shutter is usually used to switch on and off a light beam. A very high contrast and brightness can be achieved when the light source to be processed retains a narrow spectral width. Examples are lasers or LEDs, which are typically used in telecommunication and other applications. Still a good contrast and brightness can be achieved for light sources with a broader spectral width. Depending on the D-BTN design a black matrix is required to suppress light transmitting the stabilizing border area between the pixels.

In spatial light modulators (SLM) each pixel could be a D-BTN element. Among the various SLMs are electrically and optically addressed SLMs, transmissive and reflective, and amplitude and phase modulating SLMs. The SLM would represent a binary SLM since each pixel is able to be in one of two states. A D-BTN pixel could however be subdivided into sub-pixels as long as the sub-pixel dimension is larger than the cell gap of the involved LC element.

In most cases the electrode size is larger or nearly equal to the size of the photo-patterned pixel.

Since domain stabilised cells according to the invention in most cases advantageously should have a stable pitch for the required temperature range, it may be recommendable to use LC mixtures that have a pitch that does not depend on temperature. A possible approach for such an LC mixture is described in EP 0 450 025 of Rolic Ltd.

The following description presents additional design and optimization possibilities preferably with patterned alignment layers on both substrates. Such optimized pixels can be easier to switch and/or maintain an enhanced mechanical stability against pressure induced flow in the cell. The first category of pixels (easier to switch) is generally more suitable for multiplexable displays, whereas the latter pixel type (enhanced mechanical stability) is more appropriate in long-term bistable devices, which require mechanical robustness. Compromise pixels with properties that are positioned between the above two cases are conceivable too.

It has been observed that once the pixels are prepared in the energetically slightly higher state and a mechanical disturbance is initiated, the various sides of the pixel differ in their strength to withstand the disturbance and remain in the original state. Once a sub-area of a certain size has switched to the energetically lower state, the whole pixel will switch to this state. The sub-area the most easily to switch mechanically limits the robustness of the pixels. This behaviour will be illustrated with the example of a circularly shaped pixel.

FIG. 8 shows an example of a circularly shaped pixel on a bottom alignment layer. Pixel Area 1 and frame area 2 are referenced in the same way as in FIG. 1. Within this top view of a circularly shaped alignment pattern pixel the angle $\Psi$ indicates the location of the pixel border area B along the pixel border. The reference angle ($\Psi=0°$) is chosen to be the azimuthal orientation of the pixel alignment orientation. Thus, the angle $\Psi$ represents the angle difference between the azimuthal pixel orientation and the border orientation. The switching behavior into both states (lower twist to higher twist, and higher twist to lower twist) and the mechanical strength of the lower twist state against mechanical disturbance in different pixel areas B depends on the angle $\Psi$.

The description of FIG. 8 starts with the assumption that there are two bistable states of a given bistable twisted nematic devices i.e. a lower twist (LT) state and a higher twisted (HT) state. In such a device with pixels according to the invention and with e.g. rectangularly patterned pixels on only one alignment substrate, one observes that pixel sub-areas along the various pixel borders differ in their switching behavior. Some pixel border sub-areas require more electrical energy to switch than others.

For the proper long-term switching of the pixels of a device from the HT to the LT state, wherein the HT state retains a slightly lower energy than the LT state, all pixel sub-areas have to switch because otherwise the pixel goes back to the original HT state. Thus the sub-area the most difficult to switch limits the switching performance of the whole pixel. In the case of a circular pixel the properties thus depend on an angle $\Psi$ indicating the pixel border sub-area.

For devices with pixels defined on only one substrate there is therefore a first degree of freedom in the shape of the pixel geometry. For rectangularly patterned alignment pixels defined on only one substrate this means that the degree of freedom is the angle between the pixel azimuthal orientation and the sides of the rectangle pixels. The pixel geometry or in the case of rectangularly shaped pixel patterns their orientation with respect to the pixel alignment orientation represents this first design parameter. A second and more efficient design freedom arises with the use of pixel patterns on both alignment layers. The crucial design possibility (opportunity) are the values of the angle difference between the azimuthal pixel orientation and the border orientation of the pixel defining sides involved (for rectangular shaped pixels for instance the angles $\Psi_1$, $\Psi_2$, $\Psi_3$, and $\Psi_4$).

FIGS. 9 to 14 show various embodiments with alignment pixel patterns on both substrates. In these cases one free parameter to optimize is the direction under which the two pixel-defining pattern are shifted against each other (and the thus resulting $\Psi_1$–$\Psi_4$). It can be done in such a way that basically the preferable pixel sides do contribute to the resulting pixel. Since for a good switching behavior of the pixels low pretilt angles are required and since the stabilizing domains around the pixels hold a high pretilt angle, the resulting switchable pixel area is the area where both patterned substrates retain a low pretilt angle.

FIG. 9 shows two patterned alignment substrates with their low pretilt angle areas 62 and 64 and the resulting pixels 1. The bottom pixel pattern border is shown as dotted line whereas the top pixel pattern border is shown as straight line. The resulting pixel 1 is limited by the two bottom border lines 73 and 74, and two top border lines 71 and 72. Here, the involved alignment areas 64 and 62 on the two substrates have the same size and the same shape. Starting from a perfect overlap of the two pixel patterns the mutual shift of the two patterns against each other is in the diagonal direction 80. The resulting pixel area of the pixel 1 is slightly smaller than the areas 62 and 64 of the two alignment pattern.

FIG. 10 shows an example of a top and bottom alignment substrate of a domain stabilized nematic liquid crystal device with alignment pattern on both sides and the resulting device pixels.

Starting with a perfect overlap of the contributing alignment patterns 62 and 64, the two substrates are slightly shifted against each other in the diagonal direction 80 resulting in a pixel area 1. The pixel alignment orientation on the bottom substrate is horizontal with respect to the page and parallel to two pixel sides. The mutual shift of the two patterns is in the opposite direction compared with the former example of FIG. 9. Beside the possibility of a shift in direction 80 (associated with a 45° direction), said direction may also have an angle different from 45°, e.g. 40°, 30° etc.

FIG. 11 shows two patterned alignment substrates with their pixel areas and the resulting pixels. This corresponds to the situation shown in FIG. 10 but with pixel alignment directions rotated by 45°.

FIG. 12 shows another embodiment having unequal alignment patterns 62 and 64. The alignment substrates are adjusted in such a way that the resulting pixels are defined by three sides 71, 72 and 74 from the lower alignment substrate and one side 73 from the upper substrate. Thus, one alignment substrate contributes to three pixel sides and the other alignment substrate contributes to one pixel side.

FIG. 13 shows two pictures of fabricated devices placed between a polarizer and an analyzer. The upper figure shows a device in which both alignment substrates are patterned and shifted against each other in such a way that four different pixels result. After preparing them in the LT state and applying a strong mechanical force three of the four pixels make the transition to the energetically slightly lower HT state. Because of the stronger pixel border the forth pixel type "survived" the mechanical disturbance (upper right pixel). The latter pixel retains an orientation similar to the one illustrated in FIG. 9.

The lower picture of FIG. 13 is an example of a device with all pixels according to the geometry of FIG. 9. Half the pixels are in the LT state and half the pixels are in the HT state.

The upper picture of FIG. 13, Example 3, illustrates the different mechanical stability in a fabricated device with different types of pixels. Both patterned alignment substrates are prepared according to the methods described in Example 1 for the bottom patterned alignment substrate. The cell thickness is again 5 $\mu$m and the same LPP photopolymer JP265 from Vantico (former Ciba Speciality Chemicals Ltd.) and the same liquid crystal MLC14000 from Merck is used. The alignment patterns of the two substrates are shown in FIG. 9, upper half. The pixel alignment patterns are 300×300 $\mu$m$^2$. In the final device the two alignment substrates were shifted against each other in such a way that above a bottom pixel area four top pixel areas resulted in the four corners. A part of such a cell is shown in the upper half of FIG. 13 where two such four fold pixel arrays are seen.

The pixels are first prepared in their LT state (as described in the first examples). Next the device is exposed to a strong mechanical disturbance which induces a flow in the cell. This flow induces a transition from the LT to the HT state in all but one pixel type namely the upper right pixel. The pixel types and their resistance against mechanically induced flow are summarized in the following list of Pixel/LT Stability:

| Pixels | Upper right | Upper left | Lower right | Lower left |
|---|---|---|---|---|
| LT Stability | strong | medium | medium | weak |

The upper right pixels who "survived" the mechanical disturbance appears dark between a polarizer analyzer pair as seen in the upper half of FIG. 13. The original interference colors of the LT and HT states are green and red between parallel polarizer/analyzer. In order to enhance the optical contrast of the pixels a passive −90° twisted nematic cell with a thickness of 5 $\mu$m was added in the optical path after the liquid crystal device. These compensated pixels appear dark in the LT state and bright in the HT state as seen in FIG. 13.

The lower picture of FIG. 13, Example 4, illustrates an element which consists of the same two patterned alignment substrates as used for Example 1 (pixel alignment patterns of 300×300 $\mu$m$^2$), but the two substrates are adjusted against each other now in such a way that only the right upper corner pixel type results. The two corresponding alignment patterns and the resulting pixels are as shown in FIG. 9. The distance one substrate is moved against the other may for such an element preferably be between 3 and 20 $\mu$m. For the picture, the element fabricated accordingly is prepared with pixels in the LT and in the HT state. As can be seen, the non-overlapping area around the pixel can be a small fraction of the total resulting pixel area. Again, in order to enhance the optical contrast of the pixels, a passive −90° twisted nematic cell was added in the optical beam path.

A further embodiment of the invention that may advantageously use special values of the angle difference between the azimuthal pixel orientation and the border orientation of the pixel defining sides involved is shown in FIG. 14. The embodiment is made with two patterned alignment substrates 60 and 61, which are sketched in the upper part of the figure. In contrast to the patterned substrates previously described, the present substrates are provided with only a small area of stabilization domains (frame areas) 63 and 65 in the shape of an L-square.

When the two patterned substrates 60 and 61 are combined, they are adjusted against each other in such a way that a pixel area 1 forms as depicted in the lower part of the figure. The pixel is bordered by the stabilization domains 63 and 65, which set up the frame or border area 2 such that the bottom substrate contributes the upper and right pixel border 73 and 74 while the top substrate limits the pixel at the lower and left border 71 and 72.

What is claimed is:

1. A liquid crystal electro optical element comprising a pair of substrates, the respective opposing inside surfaces of which are provided with alignment surfaces or layers, and a nematic liquid crystal sandwiched between said pair of alignment surfaces or layers, wherein at least one of the alignment surfaces or layers is patterned in such a way that the azimuth or pretilt or both alignment directions are different in adjacent areas of the pattern thereby defining in at least some domains of the liquid crystal a ground state ($\Phi$0) and at least two bi- or multistable states ($\Phi$+, $\Phi$−) and suppressing the growth of the ground state of the liquid crystal.

2. The element according to claim 1, wherein the pretilt angle difference between adjacent areas of the pattern is in the range between 70° and 110°.

3. The element according to claim 2, wherein the pretilt angle difference between adjacent areas of the pattern is in the range between 80° and 100°.

4. The element according to claim 3, wherein the pretilt angle difference between adjacent areas of the pattern is in the range between 85° and 95°.

5. The element according to claim 1, wherein the alignment layer corresponding to one substrate comprises a global orientation for the whole substrate and wherein the alignment layer corresponding to the other substrate comprises first alignment directions in first portions spaced apart one from another and second alignment directions in second portions provided between the first portions, and further wherein the areas of the first portions form pixel areas.

6. The element according to claim 5, wherein the pretilt angle in the first alignment layer is less than 20°, preferably less than 10°, and wherein the pretilt angle in the second alignment layer in areas not contributing to said pixel areas is more than 50°, preferably about 80°, and further wherein the pretilt angle in the second alignment layer in areas contributing to said pixel areas is less than 20°, preferably less than 10°.

7. The element according to claim 5, wherein the azimuthal angle difference between the first alignment layer and the areas contributing to said pixel areas is about +90° and wherein the azimuthal angle difference between the first alignment layer and the areas not contributing to said pixel area is about −90°.

8. The element according to claim 1, wherein the alignment layer corresponding to one substrate comprises first alignment directions in first stripe portions spaced apart one from another and second alignment directions in second stripe portions provided between the first stripe portions, and wherein the alignment layer corresponding to the other substrate comprises third alignment directions in third stripe portions spaced apart one from another and fourth alignment directions in fourth stripe portions provided between the third stripe portions, and wherein the substrates are mounted in a way that the first and second stripe portions are at an angle to the third and fourth stripe portions, and further wherein the sandwiched areas with the first and third stripe portions form pixel areas.

9. The element according to claim 8, wherein the pretilt angle in the first alignment layer in the first stripe portions is less than 20°, preferably less than 10°, and wherein the pretilt angle in the first alignment layer in the second stripe portions is more than 50°, preferably about 80°, and wherein the pretilt angle in the second alignment layer in the third stripe portions is less than 20°, preferably less than 10°, and further wherein the pretilt angle in the second alignment layer in the fourth stripe portions is more than 50°, preferably about 80°.

10. The element according to claim 8, wherein the azimuthal angle difference between the first stripe portions and the third stripe portions is +90° and wherein the azimuthal angle difference between the first and second alignment layers and between the third and fourth alignment layers is 180°, respectively.

11. A liquid crystal electrooptical element comprising a pair of substrates, the respective opposing inside surfaces of which are provided with alignment surfaces or layers, and a nematic liquid crystal sandwiched between said pair of alignment surfaces or layers,
wherein at least one of the alignment surfaces or layers is patterned in such a way that the azimuth or pretilt or both alignment directions are different in adjacent areas of the pattern thereby defining in at least some domains of the liquid crystal a ground state ($\Phi 0$) and at least two bi- or multistable states ($\Phi+$, $\Phi-$) and suppressing the growth of the ground state of the liquid crystal,
wherein the alignment layer corresponding to one substrate comprises a chequered pattern of first alignment directions in first portions and of second alignment directions in second portions, and wherein the alignment layer corresponding to the other substrate comprises a chequered pattern of third alignment directions in third portions and of fourth alignment directions in fourth portions, and wherein the substrates are mounted in a way that the first and second portions are congruent with the third and fourth portions, respectively, and further wherein each sandwiched portion forms a pixel area.

12. The element according to claim 11, wherein the pretilt angle in the first alignment layer and in the second alignment layer is less than 50°.

13. The element according to claim 11, wherein the azimuthal angle difference between the first portions and the second portions of the first alignment layer is 180°, and wherein the azimuthal angle difference between the third portions and the fourth portions of the second alignment layer is 180°, and further wherein the azimuthal angle difference between first and third portions and between second and fourth portions is 90°.

14. The element according to claim 11, wherein the first, second, third and fourth portions are rectangular, preferably quadratic, portions.

15. The element according to claim 1, wherein the alignment layer corresponding to one substrate comprises first alignment directions in first portions spaced apart one from another and second alignment directions in second portions provided between the first portions, and wherein the alignment layer corresponding to the other substrate comprises third alignment directions in third portions spaced apart one from another and fourth alignment directions in fourth portions provided between the third portions, and wherein the substrates are mounted in a way that the first and second portions are congruent with the third and fourth portions, respectively, and further wherein the areas of the first portions and of the third portions form pixel areas.

16. The element according to claim 15, wherein the pretilt angle in the first portions is less than 20°, preferably less than 10°, and wherein the pretilt angle in the second portions is mare than 50°, preferably about 80°, and wherein the pretilt angle in the third portions is less than 20°, preferably less than 10°, and further wherein the pretilt angle in the fourth portions is more than 50°, preferably about 80°.

17. The element according to claim 15, wherein the azimuthal angle difference between the first portions and the third portions is about +90°, and further wherein the azimuthal angle difference between the second portions and the fourth portions not contributing to said pixel area is about −90°.

18. The element according to claim 1,
wherein the alignment layer corresponding to one substrate comprises first alignment directions in first portions spaced apart one from another and second alignment directions in second portions provided between the first portions, and wherein the alignment layer corresponding to the other substrate comprises third alignment directions in third portions spaced apart one from another and fourth alignment directions in fourth portions provided between the third portions,
wherein switching between the bi- or multistable states ($\Phi+$, $\Phi-$) needs different energy in different sub-areas along the border of the first portions and third portions, respectively, and
wherein the substrates are mounted in a way that areas of the first portions and of the third portions form pixel areas such that
the pixel areas are limited by first selected sub-areas along the border of the first portions and second selected sub-areas along the border of the third portions,
which selected first and second sub-areas need a) according to one preferred case more or b) according to another preferred case less energy to switch than the remaining sub-areas along the border of the first portions and third portions.

19. The element according to claim 18, wherein the substrates are mounted in a way that the first and second portions are not congruent with the third and fourth portions, respectively, but shifted in a direction.

20. The element according to claim 18, wherein the pretilt angle in the first portions is less than 20°, preferably less than 10°, and wherein the pretilt angle in the second portions is more than 50°, preferably about 80°, and wherein the pretilt angle in the third portions is less than 20°, preferably less than 10°, and further wherein the pretilt angle in the fourth portions is more than 50°, preferably about 80°.

21. The element according to claim 18, wherein the azimuthal angle difference between the first portions and the third portions is about +90°, and wherein the azimuthal angle difference between the second portions and the fourth portions not contributing to said pixel area is about −90°.

22. The element according to claim 18, wherein the first portions and third portions are of unequal shape, and wherein parts of the first portions are overlapping the fourth portions and parts of the second portions are overlapping the third portions.

23. The element according to claim 1, wherein the alignment directions in at least one of the alignment layers are created through photo-alignment.

24. A liquid crystal display device comprising a liquid crystal electrooptical element as defined in claim 1.

25. A liquid crystal display device wherein a matrix is disposed by forming each of the electrodes of the liquid crystal electrooptical element as defined in claim 1 into a scanning electrode group and a signal electrode group with pixels being formed by the intersection of the scanning electrode group and the signal electrode group.

26. An electrooptical shutter comprising a liquid crystal electrooptical element as defined in claim 1.

27. A spatial light modulator comprising a liquid crystal electro optical element as defined in claim 1.

* * * * *